US012694615B2

(12) United States Patent
Vesanen

(10) Patent No.: US 12,694,615 B2
(45) Date of Patent: Jul. 28, 2026

(54) SUBDIVIDING 3D-DATASETS FOR HIERARCHICAL LEVEL-OF-DETAIL USE

(71) Applicant: Vektorio Oy, Tampere (FI)

(72) Inventor: Juha Vesanen, Tampere (FI)

(73) Assignee: Vektorio Oy, Tampere (FI)

( * ) Notice: Subject to any disclaimer, the term of this patent is extended or adjusted under 35 U.S.C. 154(b) by 107 days.

(21) Appl. No.: 18/747,767

(22) Filed: Jun. 19, 2024

(65) Prior Publication Data

US 2024/0420417 A1 Dec. 19, 2024

(30) Foreign Application Priority Data

Jun. 19, 2023 (FI) ...................................... 20235689

(51) Int. Cl.
*G06T 17/00* (2006.01)
(52) U.S. Cl.
CPC ........ *G06T 17/005* (2013.01); *G06T 2210/12* (2013.01); *G06T 2210/36* (2013.01)
(58) Field of Classification Search
CPC ... G06T 17/005; G06T 17/20; G06T 2210/36; G06T 9/40; G06F 16/9027
See application file for complete search history.

(56) References Cited

U.S. PATENT DOCUMENTS

2014/0362074 A1    12/2014  Karras et al.
2017/0091992 A1*    3/2017  Rogers .................... G06T 17/20

FOREIGN PATENT DOCUMENTS

CN          114328450  A   *   4/2022

OTHER PUBLICATIONS

Finnish Search Report for FI 20235689 dated Feb. 7, 2024, 2 pages.
(Continued)

*Primary Examiner* — Chante E Harrison
(74) *Attorney, Agent, or Firm* — Nixon & Vanderhye PC

(57) ABSTRACT

A computer implemented method for subdividing 3D datasets in hierarchical level-of-detail for rendering, comprising: obtaining a 3D dataset from a storage; determining a bounding volume for the 3D dataset; setting a first budget for 3D data in each node; generating a plurality of levels-of-detail and 3D data for said levels-of-detail from the 3D dataset until a version of the 3D dataset fits to the budget; arranging a hierarchical tree, comprising a plurality of nodes, each node associated with at least one other node of the plurality of nodes; filling a root node with the version of the 3D dataset, that fit to the budget; filling a node for second level-of-detail with the second level-of-detail data; iteratively performing per node starting from the node for second level-of-detail: determining a primitive count for the node; in response to the primitive count being below the first budget, storing primitive data of the node, and if more levels-of-detail remain, fill all the next level-of-detail nodes of the current node with the next level-of-detail data; in response to the primitive count being above the first budget, split the node to a first and a second leaf node by splitting the volume of the node along the longest side of the node of by a splitting plane; and determining per primitive of the first and the second leaf node if the primitive is crossing the splitting plane: in response to a primitive of the first and the second leaf node crossing the splitting plane, defining split-ting plane vertices at crossings points at the split-ting plane and splitting the crossing primitive to new primitives on both sides of the splitting plane using said splitting plane vertices, storing each new primitive to one of the first and the second leaf nodes; in response to the primitive not crossing the splitting plane, storing the primitive to one of the first and the second leaf nodes; rendering a 3D view using the hierarchical level of detail data.

12 Claims, 10 Drawing Sheets

(56)           References Cited

OTHER PUBLICATIONS

Ernst, M. et al., "Early Split Clipping for Bounding Volume Hierarchies", In: 2007 IEEE Symposium on Interactive Ray Tracing. IEEE [online], Oct. 8, 2007, 6 pages.

Hoppe, H., "View-dependent refinement of progressive meshes", In: SIGGRAPH '97: Proceedings of the 24th annual conference on Computer graphics and interactive techniques. ACM [online], Aug. 3, 1997, 10 pages.

* cited by examiner

LOD 1

LOD 2

LOD 3

LOD 4

LOD 1  ⟶  LOD 1 data

210

LOD 2  ⟶  LOD 2 data

210

LOD 3  ⟶  LOD 3 data

210

LOD 4  ⟶  LOD 4 data

210

210

LOD N  ⟶  Original 3D dataset

200

LOD 1

LOD 2

LOD 3

LOD 4

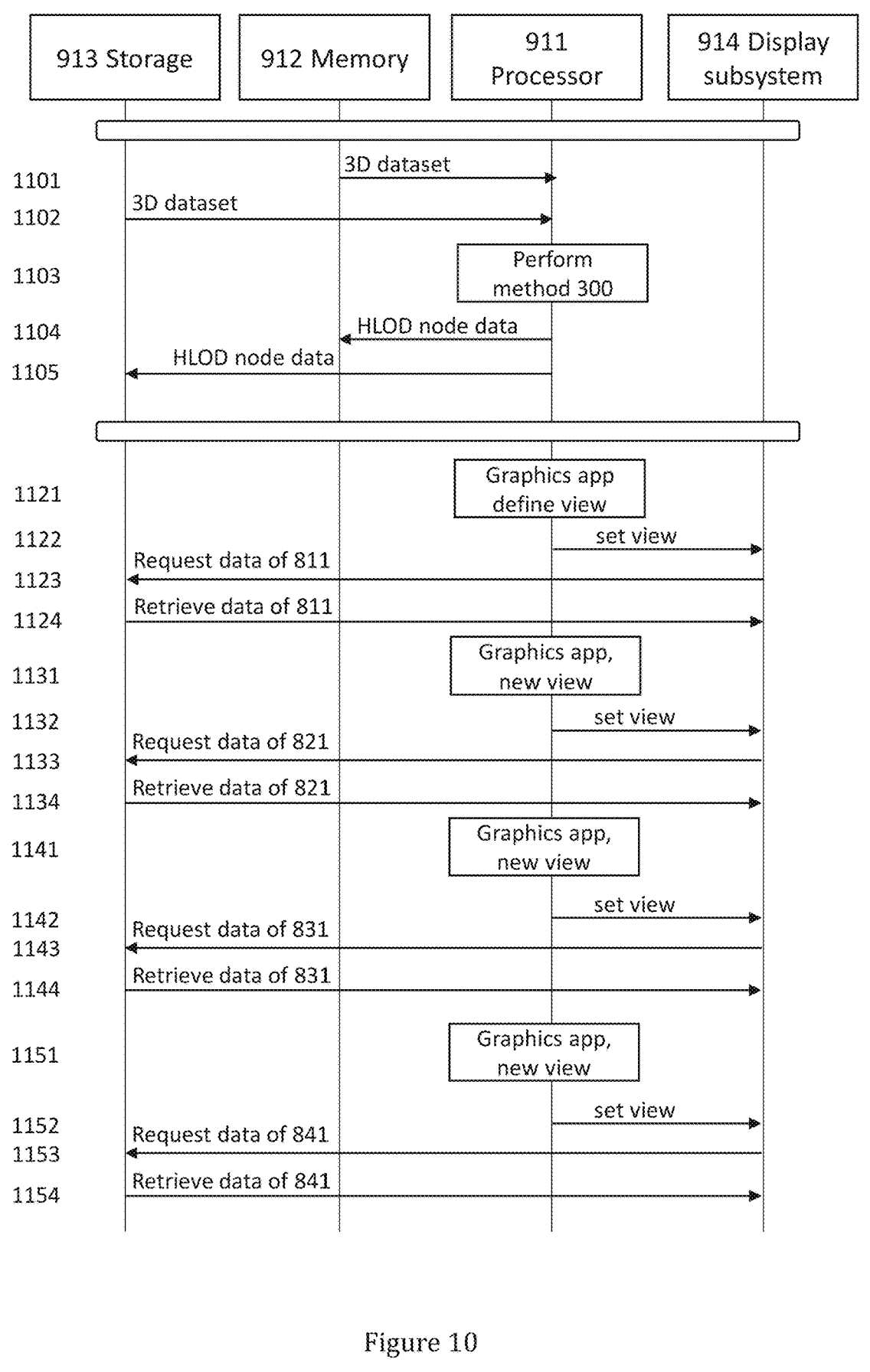

| 913 Storage | 912 Memory | 911 Processor | 914 Display subsystem |
|---|---|---|---|

1101          3D dataset →

1102     3D dataset →

1103          Perform method 300

1104          ← HLOD node data

1105     ← HLOD node data

1121          Graphics app define view 1122          set view →

1123     Request data of 811 ←

1124     Retrieve data of 811 →

1131          Graphics app, new view 1132          set view →

1133     Request data of 821 ←

1134     Retrieve data of 821 →

1141          Graphics app, new view 1142          set view →

1143     Request data of 831 ←

1144     Retrieve data of 831 →

1151          Graphics app, new view 1152          set view →

1153     Request data of 841 ←

1154     Retrieve data of 841 →

Figure 10

SUBDIVIDING 3D-DATASETS FOR HIERARCHICAL LEVEL-OF-DETAIL USE

CROSS-REFERENCE TO RELATED APPLICATIONS

This application claims priority to FI 20235689 filed Jun. 19, 2023, the entire contents of which are hereby incorporated by reference.

The present invention relates to computer graphics, especially to visualisation of three-dimensional models/designs including very large 3D-datasets, typically polygons for use cases, when different levels of details are needed.

BACKGROUND OF THE INVENTION

Several interactive 3D visualisation applications face situations and use cases when different levels of details need to be rendered and displayed from the same content or the same 3D models. This kind of requirements can be addressed be generating an aggregated proxy geometry of the 3D models and storing multiple versions of the 3D content, like polygon meshes, representing different levels of detail. This data structure is often called hierarchical level of detail (HLOD) data structure. The level of detail to be used for drawing on a display is selected according to the situation. The situation is typically guided by the user when the user chooses a viewpoint and the part of content to be shown on the display.

This kind of challenges are even more encountered when the rendering is done in run-time and the content is large having lot of details. This easily leads to a situation when an object is viewed from an angled perspective that spans over a large distance from the viewpoint, and thus resulting to the need to render very different levels of detail of the object at hand.

BRIEF DESCRIPTION OF THE INVENTION

The embodiments disclosed herein relate to the field of graphics processing and, without limitation, the use of hardware and software in the organising the 3D data structures in computer memory and storage to better align with hardware and software resources with the data traffic needed for the applications using 3D content.

It is an object of the present invention to provide an improved method and system for visualizing 3D models of large objects including a high number of features to be visualized. The objects of the invention are achieved by a method and an arrangement which are characterized by what is stated in the independent claims. The preferred embodiments of the invention are disclosed in the dependent claims.

The invention is based on a computer implemented method which is used to divide 3D datasets for hierarchical level-of-detail use. A bounding volume is defined to cover a 3D model and the 3D model is described in a plurality of hierarchical nodes of different levels-of detail. Each node may have a number of children nodes with higher level of detail. The 3D data of each node can be fitted to budget, which is determined by data traffic and/or computing resources needed to transfer, store, and process the 3D data. The nodes at the plurality of levels-of-detail are arranged in hierarchical tree structure based so that a node is slit to leaf nodes al far as needed to fit every node to the set budget.

An advantage of the method and arrangement of the invention that the implementation of the method can be used to balance computing resources such as server computing and memory capacity, server-client traffic, and latency together with 3D rendering capacity.

BRIEF DESCRIPTION OF THE DRAWINGS

In the following the invention will be described in greater detail by means of preferred embodiments with reference to the attached drawings, in which:

FIG. 10 illustrates a flow diagram in a computer graphics system using the method using 3D data with a hierarchical level of detail data structure;

DETAILED DESCRIPTION OF THE INVENTION

Figure 1:
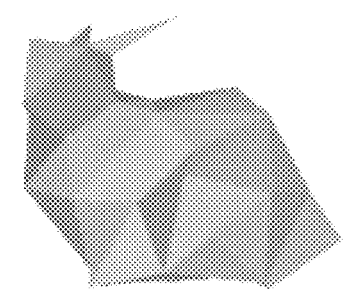
FIG. 1 illustrates a 3D model in different levels-of-detail.
Figure 1:
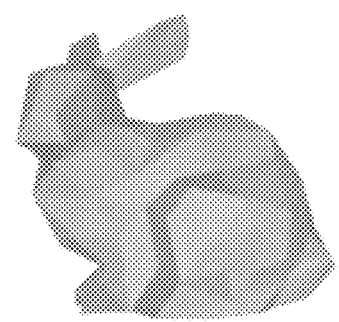
Figure 1:
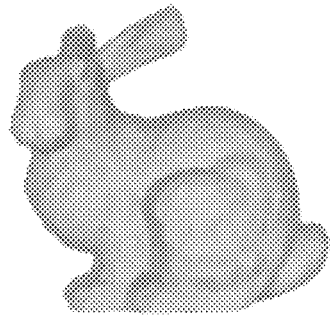
Figure 1:
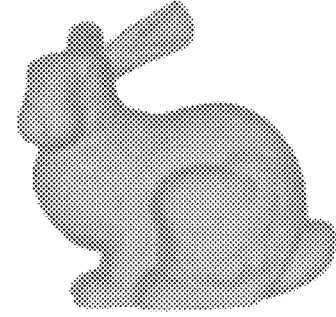

In 3D computer graphics, 3D objects are modelled as primitive objects such as points, lines, or polygons in a 3D space. A polygon with n endpoints is an n-gon. The endpoints are called vertices. A typical polygon is a triangle with three vertices. The shape of the triangle is defined by its vertices, which may be represented in different accuracies, i.e., with different number of bits. This presentation may be a fixed-point presentation or a floating-point presentation. A 3D object is constructed from polygons next to each other, which means that they are sharing the same vertices. It should be noted that also points and lines may be used. A point is an object with just one vertex, and a line is an object with just two vertices. Obviously, in most applications there are several separate 3D objects to be rendered and displayed so not all polygons are interlinked. It should be noted that typically 3D graphics in computer games typically apply mainly triangles as polygons. In applications like infrastructure modelling, other structures like lines or points are often used as well. The term primitive is used in this document generally to describe polygons, triangles, or lines. Also, a point may be a primitive, but the method would need to be modified in some respects to be used with point clouds.

The visual appearance of an 3D object depends on, among other things, the number of primitives used to model the object. The more primitives are used, the more sophisticated the 3D model is and the more details it can represent. In applications like infrastructure modelling, the 3D objects may have shapes and scales that are especially long or wide, while at the same time including lots of details in some parts of the 3D object. Contrary to gaming applications, the surfaces of 3D objects might be simpler or less sophisticated.

The number of details to be eventually rendered on a display has an impact on the hardware and software requirements. The interdependency between the number of details and the available data traffic capacity, hardware and software resources can be demonstrated e.g., in the achieved frame rate that a graphics processing system is able to achieve. An interactive graphics processing system sets even tighter requirements because the views and thus the details to be rendered depend on the user's choice and cannot be predicted. In other words, the graphics processing system has to respond to the data retrieval requests coming graphics application, which in turn are a result of user choices. The choices may include change of orientation, zooming in or out, or panning. All of them may require use of different level of detail data when moving from a view to a next view.

When the application requires representing different levels of detail, an aggregated proxy geometry of the 3D models may be generated, and multiple versions of the 3D content stored. The structure of the 3D data is often hierarchical level of detail (HLOD) data structure. The level of detail to be used for drawing on a display is selected according to the situation. Obviously, the levels with higher details in the 3D data structure contain much more data. The HLOD data structure may be divided different sections to allocate the 3D data structure to different storage resources and to different computing resources. The division strategy may be e.g., a binary tree where the 3D dataset is divided into two at each level. The tree elements are called nodes, and lines connecting the nodes are called branches. Nodes without children are called "leaf nodes", "end-nodes", or "leaves". In this document they are called leaf nodes. A finite tree structure has a member that has no superior. This member is called the "root" or root node. The root is the starting node. The division may be done geometrically meaning that the 3D dataset is divided into two equally sized sections in one dimension.

The tree structure may also be e.g., a quadtree or octree, where a quad tree structure has four branches and an oct tree has eight branches. Typically, the division is done equally in different dimension, i.e., an oct tree may divide the 3D dataset to two parts in each three orthogonal dimensions (x, y, z). The tree structure may also be based on some other strategy like the semantic information of the 3D objects.

Referring to FIG. 1, 3D models can also be constructed in a hierarchical manner, meaning that the same model is described in several levels of detail. This data structure is known as the HLOD structure. Starting from the simplest 3D model, the number of details is increasing when moving from a level to next level. Also, the number of primitives is increasing when moving from low level of detail to a higher level of detail. It should be noted that the models at different levels of details are clearly interlinked meaning that a primitive at a lower level of detail may be divided to two or more primitives at the next level of detail. The combined primitives at the higher level of detail represent the same part as the said one primitive at the said lower level of detail, only with more geometric information.

Figure 2:
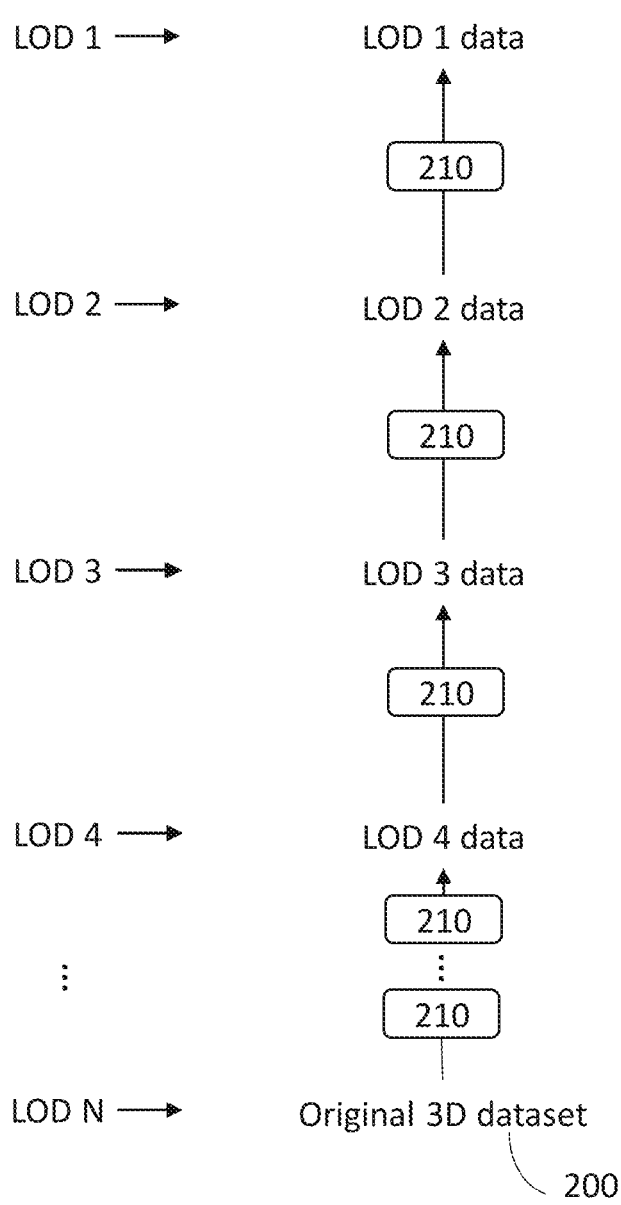
FIG. 2 illustrates different levels-of-detail and simplification per level.

Referring to FIG. 2, starting from the original, high-level of detail 3D dataset representing the 3D model or mesh, lower level-of-detail 3D models are created by simplification, e.g., by reduction methods 210. The reduction method 210 may be e.g., collapsing pairs of vertices into a single vertex to create the dataset for the next level-of-detail. Another example of a reduction method 210 is remeshing or resampling the 3D model by generating an entirely new mesh of vertices that still describes the same surface than the original mesh. In the FIG. 2, the reduction process starts from level N, which is representing the original higher level-of-detail. Level 1 is presenting the lowest level of detail and lowest accuracy. The simplification creates levels-of-detail as a sequence of levels. By default, the amount of data in the different levels of-detail is reducing when moving from a level to next, e.g., in FIG. 2 from the level-of-detail 2 to the level-of-detail 1. Typically, the target is to continue the simplification to a level, where the data of the 3D model at the particular level can be fitted to a set budget. Once this level is reached, the total number of levels-of detail is determined. The lowest accuracy level is in this document labelled as level-of-detail 1. It may be also referred as the root node. A typical number of levels-of-detail is approximately 10, but it may be varied depending on complexity of the original 3D model, on the magnitude of reduction per reduction step or by the scale requirements of the application. Groups of 3D objects may also be clustered together and replaced them with a single, aggregated proxy 3D object. A HLOD structure can be generated for said group of 3D objects as well.

Figure 3:
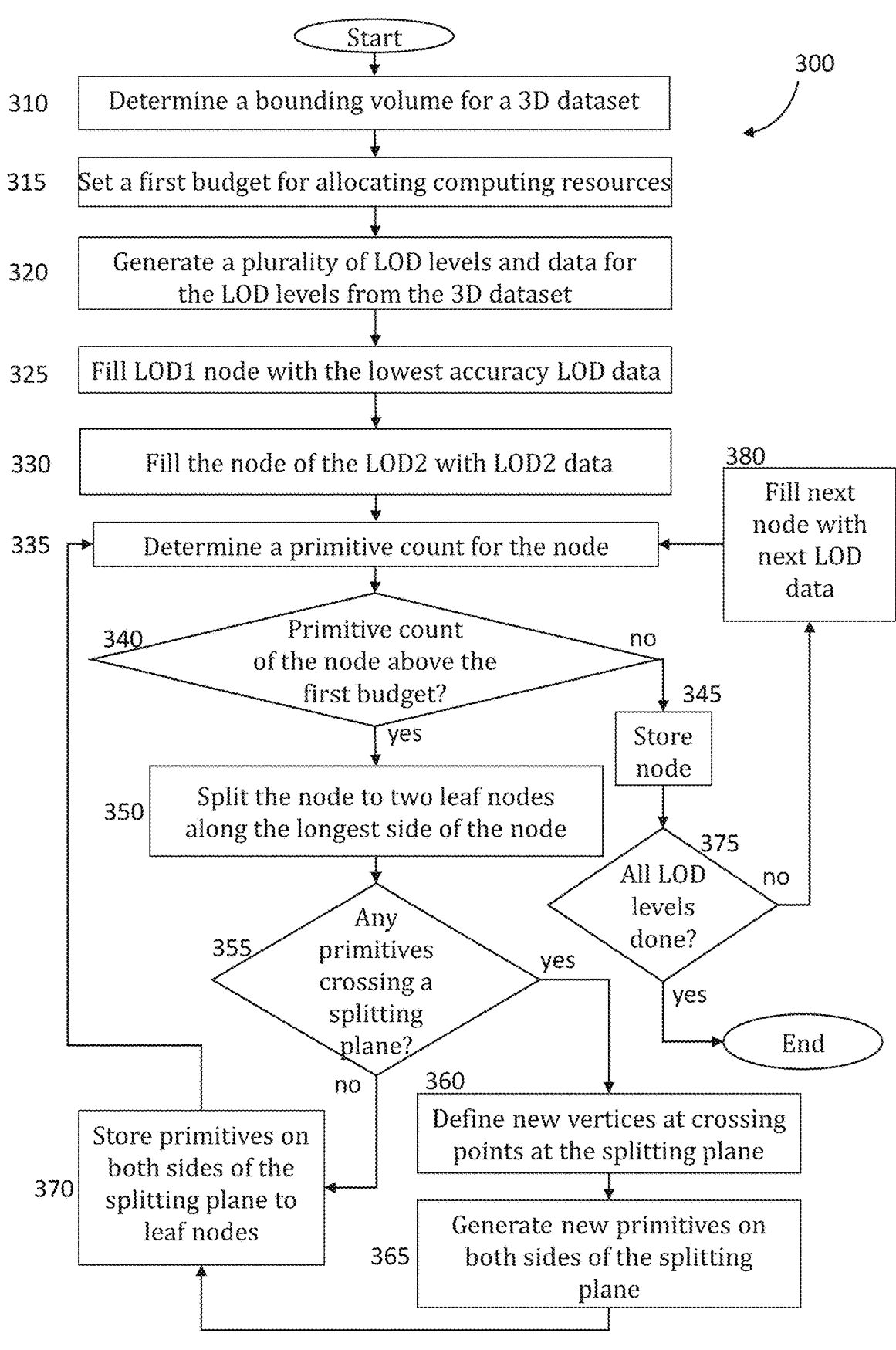
FIG. 3 illustrates an embodiment of the method.

Referring to FIG. 3, according to an embodiment of the invention, there is a computer implemented method 300 for subdividing 3D datasets for hierarchical level-of-detail use, comprising the following steps, which describe the method.

In step 310, a bounding volume for a 3D dataset is determined. The bounding volume is rectangular cuboid, in which the whole 3D model of the 3D dataset can be fitted in.

In step 315, a first budget for allocating computing resources is set. The first budget may be determined based on available computing resources or based on performance requirements of 3D rendering i.e., how many primitives can be processed by the available resources.

In step 320, a plurality of levels-of-detail and data for said levels-of-detail are generated from the 3D dataset until on a level-of-detail a simplified dataset version is reached that can be fitted to the first budget.

In step 325 the lowest accuracy level-of-detail node is filled with the lowest level-of-detail data. This level is labelled as level-of-detail 1 or LOD1.

In step 330, the second lowest accuracy level-of-detail (LOD2) node is filled with the second lowest level-of-detail data.

In step 335, starting from LOD2, primitive count of the node is determined. The steps 335 to 380 are repeated until all levels-of detail have been processed.

In step 340, a primitive count of the node is checked. If the primitive count is below first budget, the procedure is continued to step 345.

In step 350, if the primitive count of the node is above first budget, the node is split in to a first and second leaf node along the longest side of the bounding volume of the node by a splitting plane.

In step 355, the primitives of the first and the second two leaf nodes are checked if they are crossing the splitting plane.

In step 360, in response to a primitive of the node crossing the splitting plane, splitting plane vertices are created at crossings points at the splitting plane.

In step 365 new primitives on both sides of the splitting plane are generated by splitting said primitive along the splitting plane using said splitting plane vertices. If a vertex of the primitive being split is at the splitting plane, a first new primitive is created on a first side of the splitting plane, and a second new primitive is created on a second side of the splitting plane. If no vertex of the primitive being split is at the splitting plane, two first new primitives are created on the first side of the splitting plane, and a second new primitive is created on the second side of the splitting plane.

In step 370, each primitive on both sides of the splitting plane is stored to one of the first and the second leaf nodes. The primitives of the node are divided to the first and the second leaf nodes so that no primitives cross the splitting plane.

In step 375, a check is made whether all LODs have been processed or not and the method is exited if all LODs have been processed.

In step 380, the process moves to next node and the node for next level-of-detail is filled with the next level-of-detail data.

A data structure of a node in the HLOD comprises data of primitives, a reference to a parent node with the exception of the root node, coordinates of the bounding box and an estimate of error. Said bounding box is either the same as the bonding box of the parent node, or it is a half of the bounding box of the parent node in case the node is split. It is also possible that a node is further split more than once during the checking of the primitive count against the budget. In such a case the parent node has several children nodes. The estimate of error may be an aggregated sum of geometric error of each primitive when compared against the original dataset.

According to another embodiment of the invention, the computer implemented method comprises normalizing the coordinates of the primitives of the 3D dataset with respect to the centre point of the bounding volume of the 3D set. Said normalization may be done before step 310, or before step 315 or before 320.

Figure 4:
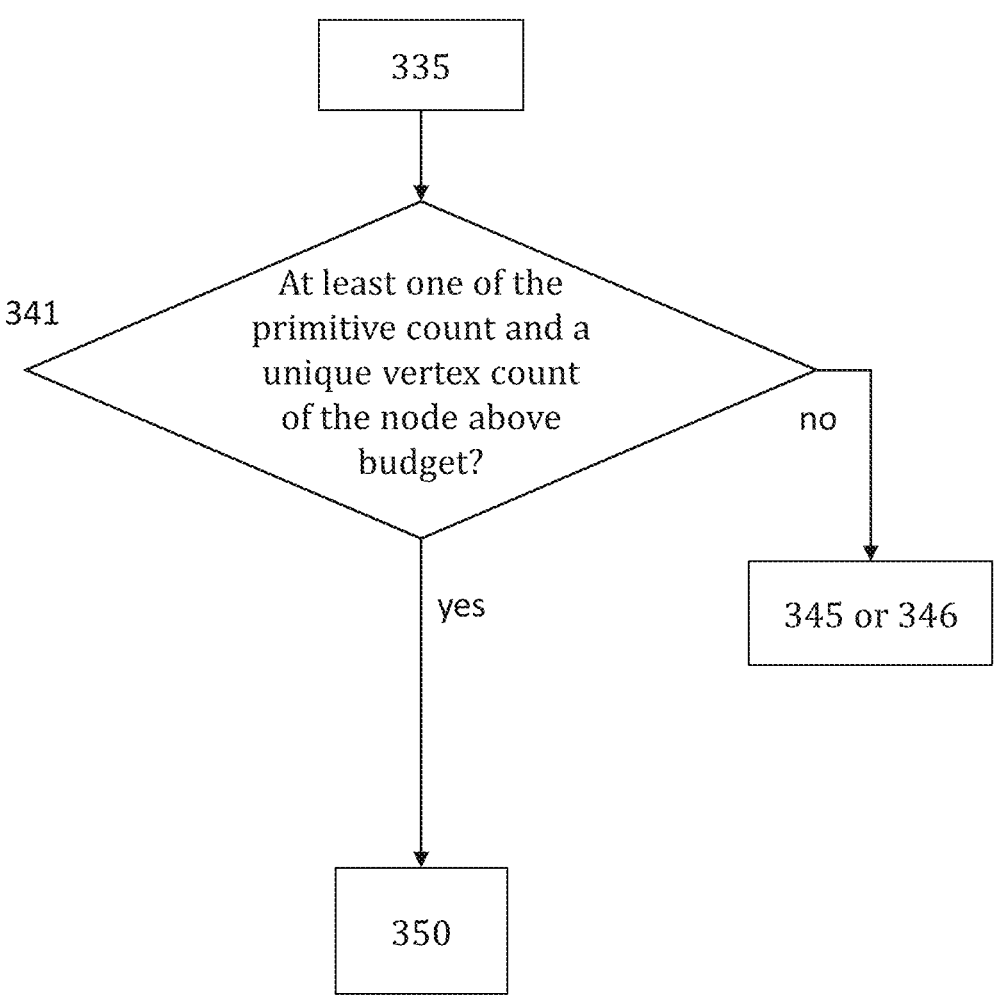
FIG. 4 illustrates another embodiment of the method.

According to another embodiment and referring to FIG. 4, said splitting of the node is done in response 341 to at least one of a unique vertex count being above a second budget and the primitive count being above the first budget. The unique vertex count comprises the number of individual vertices in the node. In case the 3D data within the node comprises parts of 3D objects that are not interlinked i.e., the primitives of the node are not part of a single mesh, the unique vertex count may be larger than the primitive count. Also, if a 3D object is a non-manifold mesh, the unique vertex count may be larger than the primitive count.

Figure 5:
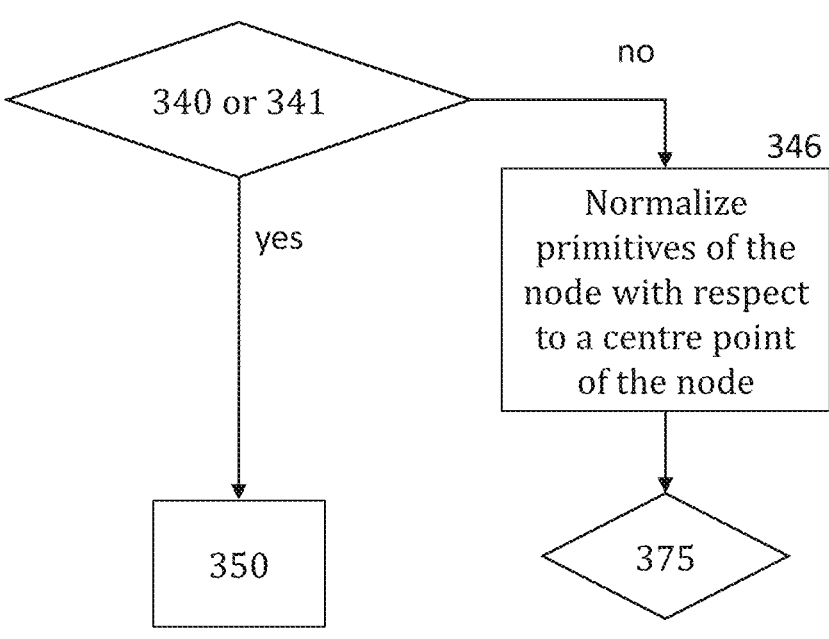
FIG. 5 illustrates another embodiment of the method.

Referring to FIG. 5, according to another embodiment, the computer implemented method may comprise, in response to the primitive count being above the first budget or the unique vertex count being above the second budget, normalizing 346 the primitives of the node with respect to centre point of the node. In the normalizing, the coordinates of the vertices of the primitives are presented with respect to the centre point of the node. Typically, the centre point of the node is represented in a high precision, e.g., in 32 or 64-bit floating point format. The coordinates of the vertices of the primitives are presented in a lower precision e.g., in 16-bit fixed point format e.g., to save data traffic from a server computer to a client computer or to save memory or storage.

Figure 6:
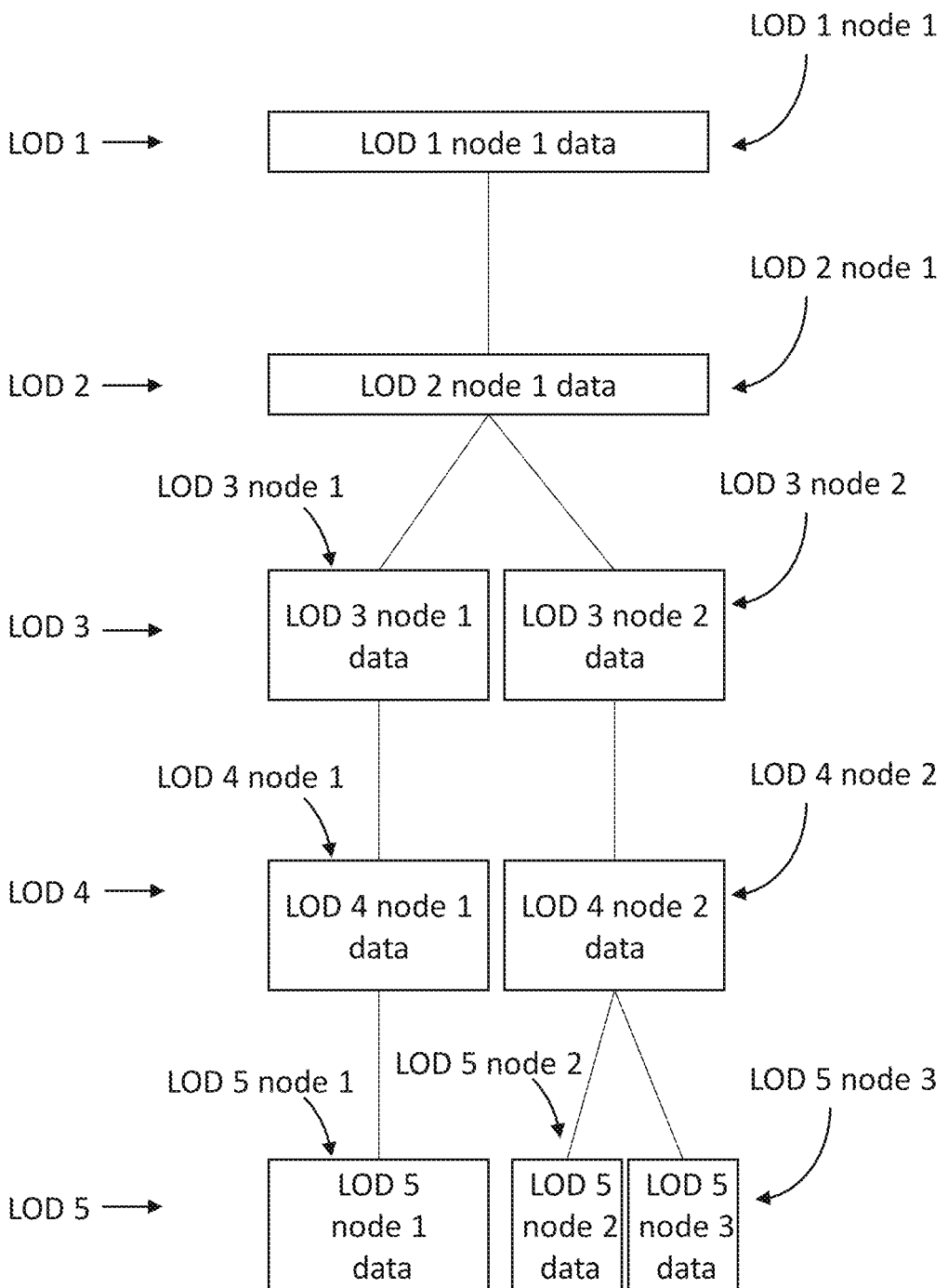
FIG. 6 illustrates a hierarchical level-of-detail data structure.
Figure 7:
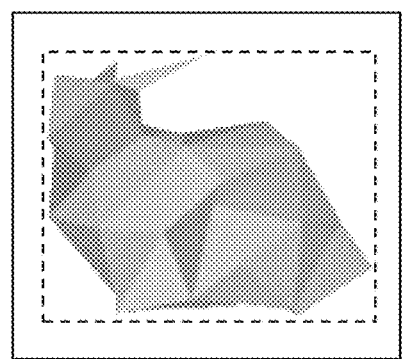
FIG. 7 illustrates a 3D model split into hierarchical level-of-detail data structure.
Figure 7:
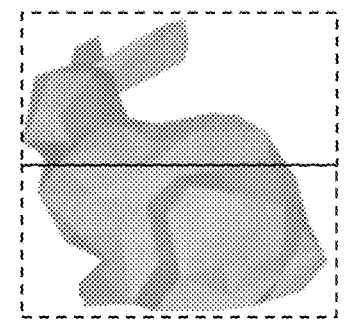
Figure 7:
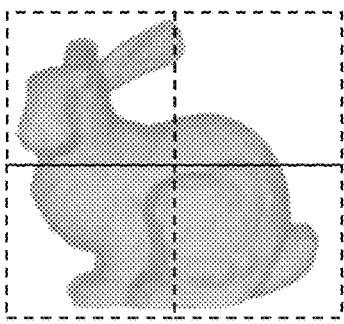
Figure 7:
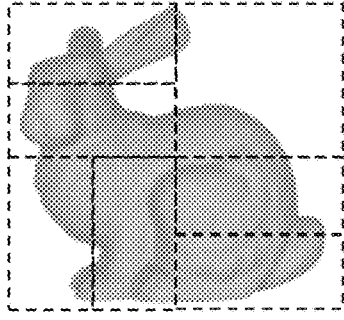

FIG. 6 illustrates an example how LODs comprise a different number of nodes, and how a level-of detail node contains said node data. FIG. 7 illustrates how a 3D object (here: bunny) may be split to different level of-detail nodes at different LODs. The dashed lines represent how the 3D model is split to different sections. The 3D data of said sections is stored in the different nodes of a LOD. The LODs with higher accuracy (e.g., LOD 4 in FIG. 7) comprise more nodes as there is more data in the LOD. More nodes are needed to fit the data to a first budget per node.

Figure 8:
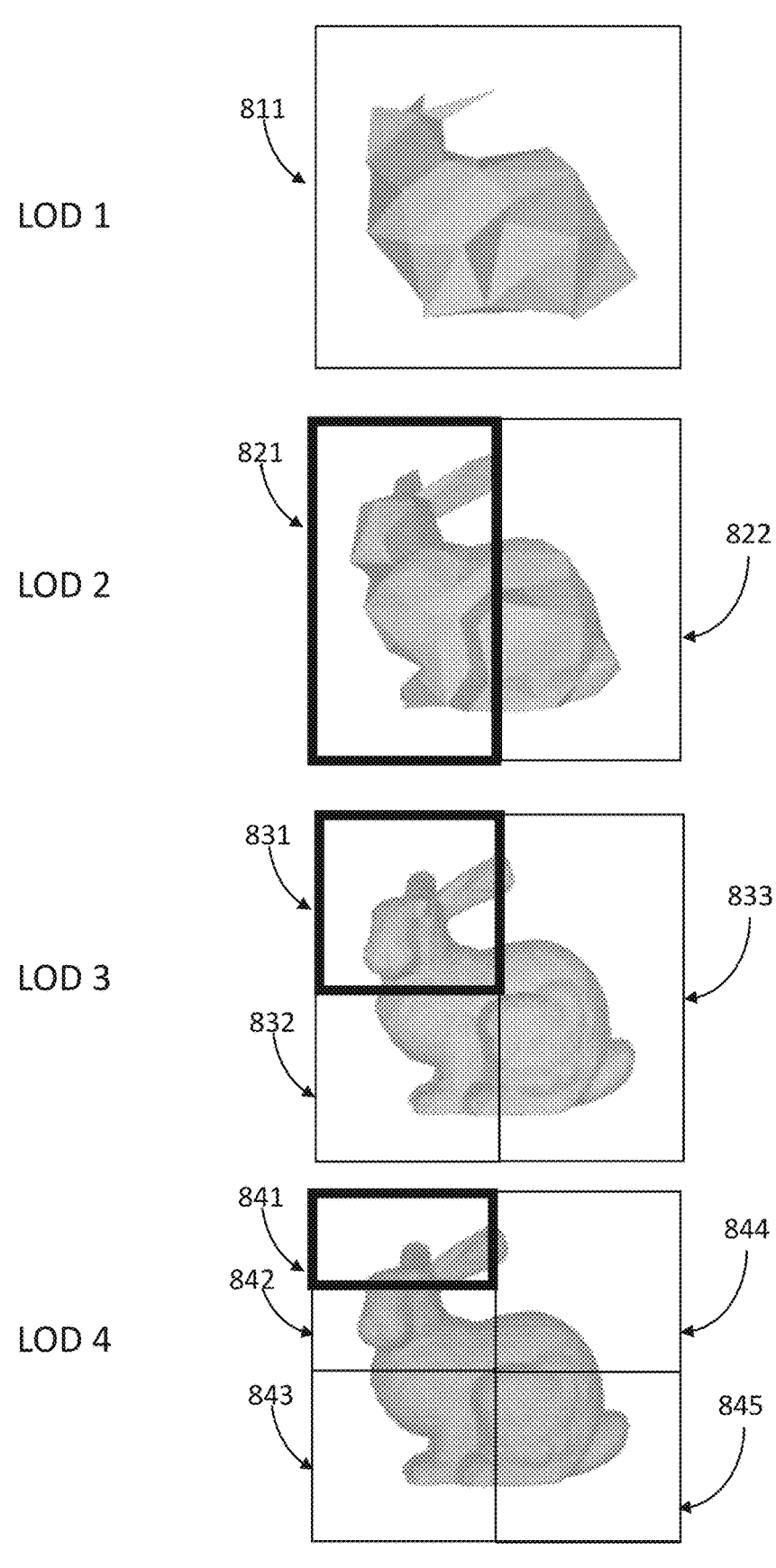
FIG. 8 illustrates use of a 3D model split into hierarchical level-of-detail data structure.

Referring to FIG. 8, in rendering a 3D object to a view for a user, the different HLOD levels are used depending on the selected view by the user and on the distance of the object from the selected viewpoint i.e., a camera viewing point that represents the viewing point and orientation. For example, if the whole 3D object (bunny) is viewed and the part 811 of the 3D model is used in rendering. When the view is limited to left part of the 3D model and more accuracy is needed the data is retrieved from LOD2 part 821. When zooming further to the head of the bunny, data is retrieved from LOD3 part 831. When zooming further to the cars of the bunny, data is retrieved from LOD4 part 841. Again here, the example of FIG. 8 is for obvious reasons shown as 2D picture to illustrate the levels of details. An actual 3D dataset comprises 3D data. When a 3D object is viewed from a larger distance, the method uses primitive data from the lower levels-of-detail. Each level-of-detail is typically quadratically smaller than the next higher level-of-detail. When a 3D object is viewed from a short distance, the method uses primitive data from the higher levels-of-detail from the nodes that contain the primitives of the parts that are visible in the view. Obviously, also the accuracy of the display used for rendering a view affects which levels-of detail should be used. Rendering to a display with higher pixel count and accuracy, typically uses data from the higher levels-of-detail.

Figure 9:
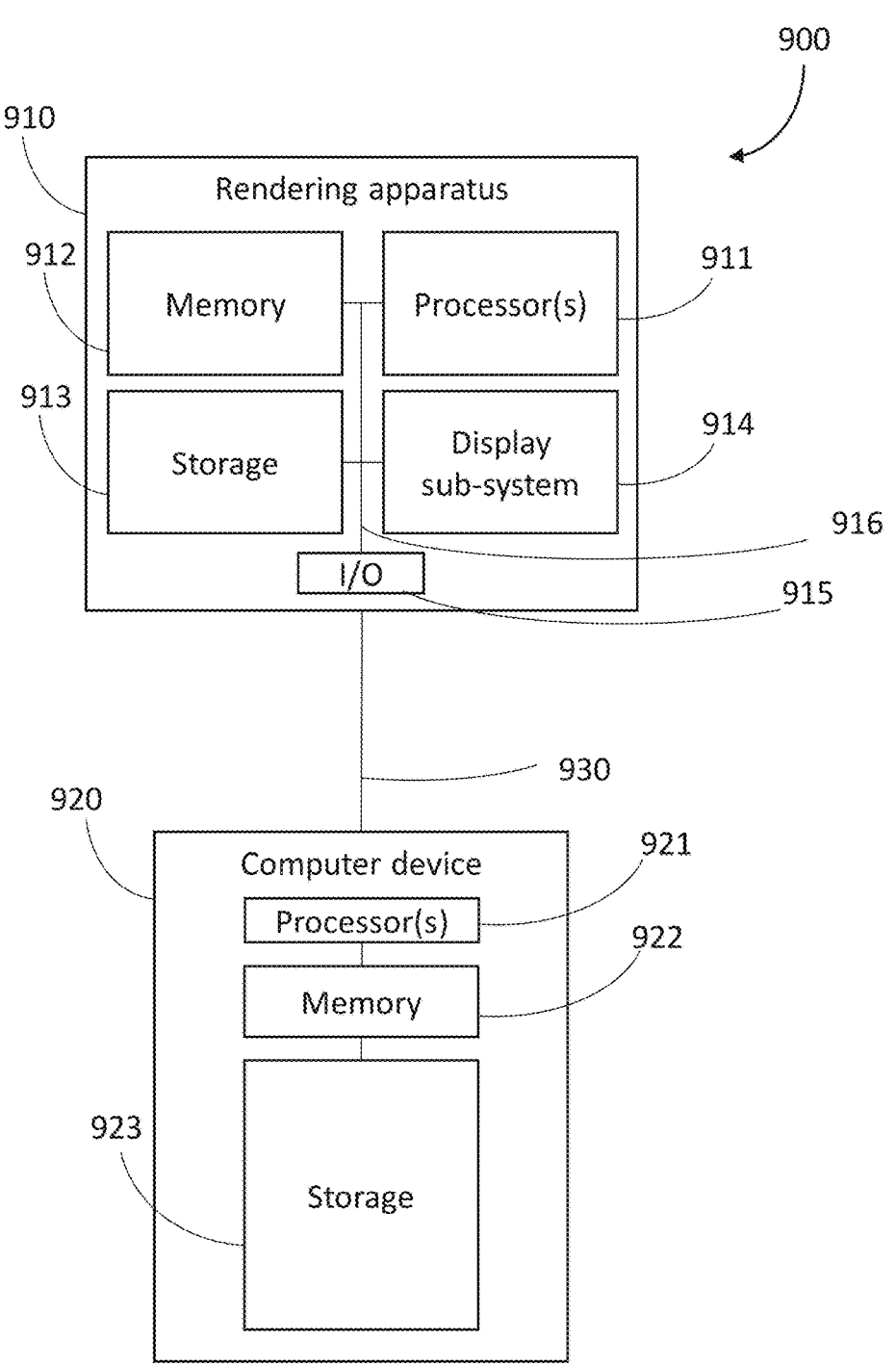
FIG. 9 illustrates a computer graphics system.

FIG. 9 illustrates a rendering apparatus 910 comprising at least one processor 911, a storage 913 hosting the 3D dataset 200 and a plurality of LOD nodes derived from the 3D dataset 200 using the method 300, at least one memory 912 including computer program code comprising instructions stored thereon to execute the method 300 and data from the 3D dataset 200 and from the plurality of LOD nodes derived from the 3D dataset 200 to be loaded from the storage 913 to the memory 912, a display sub-system 914 configured to render data from 3D dataset 200 and the plurality of LOD nodes derived from the 3D dataset 200 among other visual content to a display. In an aspect, the rendering apparatus 910 may also include an interface unit 915 configured to connect the rendering apparatus 910 to other computers. A computer graphics system 900 may comprise the rendering apparatus 910 connected via a computer network 930 to a server apparatus 920, a server comprising at least one processor 921 and at least one memory 922 including computer program code, and a storage 923 hosting the 3D dataset 200 and a plurality of LOD nodes derived from the 3D dataset 200 using the method 300. In the computer graphics system 900 the rendering apparatus 910 retrieves data from renders the 3D content, using among other content, data from the 3D dataset 200 based on the computer program code. The rendering apparatus 910 may be connected to the server apparatus 920 via a computer network 920, where in the computer network 930 may be e.g., a local area network or a wide area network. The response time of data requests from the rendering apparatus 910 to the server apparatus 920 may depend on the type of network connectivity and may thus impact on the performance of the rendering in an interactive 3D visualisation application. In an interactive 3D visualisation application, speed of response time and data transfer from the server apparatus 920 to the rendering apparatus 910 impacts the overall performance e.g., the achieved frame rate in the interactive 3D visualisation application. When the 3D dataset 200 is arranged in a hierarchical level of detail data structure using the method 300, only essential data may need to be retrieved from the server apparatus 920 to the rendering apparatus 910. In an aspect, the storage 913 of the rendering apparatus 910 is hosting the 3D dataset 200 and the plurality of LOD nodes derived from the 3D dataset 200 using the method 300. The response time of data requests from the display subsystem 914 to the storage 913 or to the memory 912 may depend on speed of an interconnecting bus 916 of the rendering apparatus 910. In an interactive 3D visualisation application, speed of response time and data transfer from the storage 913 or from the memory 912 to the display subsystem 914 impacts the overall performance e.g., the achieved frame rate in the interactive 3D visualisation application. When the 3D dataset 200 is arranged in a hierarchical level of detail data structure using the method 300, only essential data may need to be retrieved from the storage 913 or from the memory 912 to the display subsystem 914. Another aspect of the performance is the required local memory in the display subsystem 914. When the 3D dataset 200 is arranged in a hierarchical level of detail data structure using the method 300, the display subsystem may be implemented with a smaller amount of local memory to achieve the same frame rate as without using the method 300.

FIG. 10 exemplifies a flow diagram of the example of FIG. 8 using the rendering apparatus 910 of FIG. 9. In the first section, the processor 911 retrieves 1101 an original 3D dataset from the memory 912. The processor 911 may also retrieve 1102 the original 3D dataset from the storage 913. The processor 911 performs 1103 the method 300. In 1104, the processor 911 stores 1104 a generated HLOD data structure to memory 912. The processor 911 may also store 1105 the generated HLOD data structure to memory 915. In 1121, a graphics application executed by processor 911 defines a view to be shown on the display. In 1122, the display subsystem 914 requests 1123 and retrieves 1124 3D data from the storage to display a part of the of the 3D model 811 of FIG. 8. After this, the graphics app defines 1131 a new view. In 1132, the display subsystem 914 requests 1133 and retrieves 1134 3D data from the storage to display a part of the of the 3D model 821 of FIG. 8. Here, the retrieved data includes only a part of the 3D data and corresponds to the view defined by the graphics app. In 1141-1144 and in 1151-1154, the process is done again, but for a part of the of the 3D model 831 and 841, respectively, of FIG. 8.

In another aspect, the example of FIG. 10 can also be implemented in a graphics processing system, wherein the display subsystem 914 comprises a processor e.g., a graphics processor, which is performing the steps described in 1101-1105. Alternatively, the processor 911 may also perform in 1121-1124, 1131-1134, 1141-1144 and in 1151-1154.

In another aspect, the example of FIG. 10 can also be implemented in a graphics processing system, wherein the processor 921 of the server apparatus 920 performs the steps described in 1101-1105 and stores the generated HLOD data structure to memory 922 of the server apparatus 920 or the storage 923 of the server apparatus 920. In this aspect, a graphics application executed by processor 911 of the rendering apparatus 910 defines a view to be shown on the display. The steps of 1123-1124 will in this aspect be performed by retrieving the requested 3D data via the computer network 930 from the server apparatus 920. Similarly, the steps 1133-1134, 1143-1144 and 1153-1154, will be performed via the computer network 930 from the server apparatus 920.

It is obvious for a person skilled in the art, that there are several parameters affecting the overall performance, including achieved frame rate of a graphics application, like local memory size at the display subsystem 914, data transfer speed in an interconnecting bus 916, data transfer speed, latency and capacity at the computer network 930, and graphics processing capacity at the display subsystem 914.

According to another embodiment of the invention, the computer implemented further comprises determining a bounding box for each node of the highest accuracy and normalizing the primitives of said node with respect to a centre point of said node. Doing so, further savings in the amount of data or data traffic between a server computer and a client computer e.g., a rendering apparatus may be achieved.

It will be obvious to a person skilled in the art that, as the technology advances, the inventive concept can be implemented in various ways. The invention and its embodiments are not limited to the examples described above but may vary within the scope of the claims.

The invention claimed is:

1. A computer implemented method for subdividing 3D datasets in hierarchical level-of-detail for rendering, the method comprising:
   obtaining a 3D dataset from a storage;
   determining a bounding volume for the 3D dataset;
   setting a first budget for 3D data in each node of a hierarchical tree;
   generating a plurality of levels-of-detail and 3D data for said levels-of-detail from the 3D dataset until a version of the 3D dataset fits to the budget, including determining said version of the 3D dataset as the lowest level-of-detail data and determining the other levels-of-detail and 3D data of the plurality of levels-of-detail as higher levels-of-detail data;
   arranging the hierarchical tree, comprising a plurality of nodes, each node associated with at least one other node of the plurality of nodes;
   filling a root node with the version of the 3D dataset, that fit to the budget;
   filling a node for second level-of-detail with the second level-of-detail data;
   iteratively performing per node starting from the node for second level-of-detail:
      determining a primitive count for the node;
      in response to the primitive count being below the first budget, storing primitive data of the node, and if more levels-of-detail remain, filling all the next level-of-detail nodes of the current node with the next level-of-detail data;
      in response to the primitive count being above the first budget, splitting the node to a first and a second leaf node by splitting the volume of the node along the longest side of the node by a splitting plane; and
      determining per primitive of the first and the second leaf node if the primitive is crossing the splitting plane:
         in response to a primitive of the first and the second leaf node crossing the splitting plane, defining splitting plane vertices at crossings points at the splitting plane and splitting the crossing primitive to add new primitives on both sides of the splitting plane using said splitting plane vertices, storing each new added primitive to one of the first and the second leaf nodes;
         in response to the primitive not crossing the splitting plane, storing the primitive to one of the first and the second leaf nodes;
   rendering, by a processor, a 3D view using the hierarchical level of detail data.

2. The method according to claim 1, wherein said splitting of the node is done in response to at least one of a unique vertex count being above a second budget and the primitive count being above the first budget.

3. The method according to claim 1, further comprising in response to the primitive count being below the budget, normalizing the primitives of the node with respect to a center point of the node.

4. The method according to claim 3, further comprising determining a bounding box for each node of a highest accuracy and normalizing the primitives of said node with respect to a center point of said node.

5. An apparatus comprising at least one processor, and at least one memory including computer program code; the at least one memory and the computer program code configured to, with the at least one processor, cause the apparatus at least to perform: subdividing 3D datasets in hierarchical level-of-detail for rendering, including at least:

obtaining a 3D dataset from a storage;

determining a bounding volume for the 3D dataset;

setting a first budget for 3D data in each node of a hierarchical tree;

generating a plurality of levels-of-detail and 3D data for said levels-of-detail from the 3D dataset until a version of the 3D dataset fits to the budget, including determining said version of the 3D dataset as the lowest level-of-detail data and determining the other levels-of-detail and 3D data of the plurality of levels-of-detail as higher levels-of-detail data;

arranging the hierarchical tree, comprising a plurality of nodes, each node associated with at least one other node of the plurality of nodes;

filling a root node with the version of the 3D dataset, that fit to the budget;

filling a node for second level-of-detail with the second level-of-detail data;

iteratively performing per node starting from the node for second level-of-detail:

determining a primitive count for the node;

in response to the primitive count being below the first budget, storing primitive data of the node, and if more levels-of-detail remain, filling all the next level-of-detail nodes of the current node with the next level-of-detail data;

in response to the primitive count being above the first budget, splitting the node to a first and a second leaf node by splitting the volume of the node along the longest side of the node by a splitting plane; and determining per primitive of the first and the second leaf node if the primitive is crossing the splitting plane:

in response to a primitive of the first and the second leaf node crossing the splitting plane, defining splitting plane vertices at crossings points at the splitting plane and splitting the crossing primitive to add new primitives on both sides of the splitting plane using said splitting plane vertices, storing each new added primitive to one of the first and the second leaf nodes;

in response to the primitive not crossing the splitting plane, storing the primitive to one of the first and the second leaf nodes;

rendering a 3D view using the hierarchical level of detail data.

6. The apparatus according to claim 5, wherein said splitting of the node is done in response to at least one of a unique vertex count being above a second budget and the primitive count being above the first budget.

7. The apparatus according to claim 5, wherein the processor is further configured to, in response to the primitive count being below the budget, normalize the primitives of the node with respect to a center point of the node.

8. The apparatus according to claim 7, wherein the processor is further configured to determine a bounding box for each node of a highest accuracy and normalize the primitives of said node with respect to a center point of said node.

9. A non-transitory computer readable storage medium comprising instructions stored thereon that, when executed, subdivide 3D datasets in hierarchical level-of-detail for rendering, by performing operations comprising:

obtaining a 3D dataset from a storage;

determining a bounding volume for the 3D dataset;

setting a first budget for 3D data in each node of a hierarchical tree;

generating a plurality of levels-of-detail and 3D data for said levels-of-detail from the 3D dataset until a version of the 3D dataset fits to the budget, including determining said version of the 3D dataset as the lowest level-of-detail data and determining the other levels-of-detail and 3D data of the plurality of levels-of-detail as higher levels-of-detail data;

arranging the hierarchical tree, comprising a plurality of nodes, each node associated with at least one other node of the plurality of nodes;

filling a root node with the version of the 3D dataset, that fit to the budget;

filling a node for second level-of-detail with the second level-of-detail data;

iteratively performing per node starting from the node for second level-of-detail:

determining a primitive count for the node;

in response to the primitive count being below the first budget, storing primitive data of the node, and if more levels-of-detail remain, filling all the next level-of-detail nodes of the current node with the next level-of-detail data;

in response to the primitive count being above the first budget, splitting the node to a first and a second leaf node by splitting the volume of the node along the longest side of the node by a splitting plane; and determining per primitive of the first and the second leaf node if the primitive is crossing the splitting plane:

in response to a primitive of the first and the second leaf node crossing the splitting plane, defining splitting plane vertices at crossings points at the splitting plane and splitting the crossing primitive to add new primitives on both sides of the splitting plane using said splitting plane vertices, storing each new added primitive to one of the first and the second leaf nodes;

in response to the primitive not crossing the splitting plane, storing the primitive to one of the first and the second leaf nodes;

rendering a 3D view using the hierarchical level of detail data.

10. The non-transitory computer readable storage medium according to claim 9, wherein said splitting of the node is done in response to at least one of a unique vertex count being above a second budget and the primitive count being above the first budget.

11. The non-transitory computer readable storage medium according to claim 9, wherein in response to the primitive count being below the budget, the primitives of the node are normalized with respect to a center point of the node.

12. The non-transitory computer readable storage medium according to claim 11, wherein a bounding box is determined for each node of a highest accuracy and the primitives of said node are normalized with respect to a center point of said node.

\* \* \* \* \*